United States Patent
Ali et al.

(10) Patent No.: US 10,439,892 B2
(45) Date of Patent: Oct. 8, 2019

(54) OPTIMIZING PERFORMANCE BASED ON BEHAVIORAL AND SITUATIONAL SIGNALS

(71) Applicant: Microsoft Technology Licensing, LLC, Redmond, WA (US)

(72) Inventors: Zohaib H Ali, Redmond, WA (US); Srinivasa Reddy Manda, Redmond, WA (US); Tao Zhang, Redmond, WA (US); Sirish Kumar Balaga, Redmond, WA (US); Christian Piccolo, Redmond, WA (US); Russell L. Simpson, Jr., Redmond, WA (US); Selvaraj Nalliah, Redmond, WA (US); Eduardo D. Melo, Redmond, WA (US); David P Limont, Redmond, WA (US); Kevin C Clement, Redmond, WA (US); Thomas W. Millett, Redmond, WA (US); Samuele Carpineti, Redmond, WA (US); Xiao Hu, Redmond, WA (US); Mihir S Ray, Redmond, WA (US); David L Meyers, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 135 days.

(21) Appl. No.: 15/388,871

(22) Filed: Dec. 22, 2016

(65) Prior Publication Data
US 2018/0048533 A1    Feb. 15, 2018

Related U.S. Application Data

(60) Provisional application No. 62/374,714, filed on Aug. 12, 2016.

(51) Int. Cl.
*H04L 12/24* (2006.01)
*H04L 29/06* (2006.01)
(Continued)

(52) U.S. Cl.
CPC ............ *H04L 41/147* (2013.01); *G06F 11/30* (2013.01); *G06Q 10/06315* (2013.01); *H04L 43/16* (2013.01); *H04L 67/22* (2013.01)

(58) Field of Classification Search
CPC ........ H04L 41/147; H04L 67/22; H04L 43/16
See application file for complete search history.

(56) References Cited

U.S. PATENT DOCUMENTS

| | | | |
|---|---|---|---|
| 5,812,780 A | 9/1998 | Chen et al. | |
| 5,977,964 A | 11/1999 | Williams et al. | |

(Continued)

OTHER PUBLICATIONS

Camps, et al., "Web browser energy consumption", In Proceedings of 8th International Conference on Communications, Jun. 10, 2010, pp. 397-400.

(Continued)

*Primary Examiner* — Abdullahi E Salad
(74) *Attorney, Agent, or Firm* — Michael Best & Friedrich LLP

(57) ABSTRACT

Variety of approaches to optimize performance based on behavioral and situational signals are described. A productivity service initiates operations to optimize performance upon receiving a behavioral signal and/or a situational signal associated with a user. The behavioral signal and/or the situational signal are analyzed to infer a usage pattern associated with a component of an application. Next, a failure of the usage pattern is detected in a comparison to an utility threshold. In response, the application is instructed to interrupt an execution of the component.

19 Claims, 7 Drawing Sheets

(51) Int. Cl.
    *H04L 12/26*     (2006.01)
    *H04L 29/08*     (2006.01)
    *G06F 11/30*     (2006.01)
    *G06Q 10/06*     (2012.01)

(56) References Cited

U.S. PATENT DOCUMENTS

| | | | |
|---|---|---|---|
| 7,257,614 B2 | 8/2007 | Philyaw et al. | |
| 7,653,761 B2 | 1/2010 | Juster et al. | |
| 8,370,613 B1* | 2/2013 | Manadhata | G06F 9/4401 713/2 |
| 8,543,907 B1 | 9/2013 | Roskind | |
| 8,620,276 B2 | 12/2013 | Khoury | |
| 8,832,753 B2 | 9/2014 | Andrade | |
| 2002/0138431 A1* | 9/2002 | Antonin | G06Q 20/108 705/42 |
| 2008/0154776 A1* | 6/2008 | Xia | G06F 8/60 705/51 |
| 2009/0327482 A1* | 12/2009 | Malhotra | G06F 11/30 709/224 |
| 2010/0183132 A1 | 7/2010 | Satyavolu et al. | |
| 2011/0093790 A1 | 4/2011 | Maczuba | |
| 2011/0131503 A1 | 6/2011 | Graham | |
| 2011/0295689 A1 | 12/2011 | Brady | |
| 2012/0143694 A1* | 6/2012 | Zargahi | G06Q 30/0603 705/14.66 |
| 2013/0080910 A1* | 3/2013 | Bingell | G06F 3/048 715/744 |
| 2013/0132199 A1 | 5/2013 | Croy | |
| 2014/0032449 A1* | 1/2014 | Kacin | H04L 41/0883 706/12 |
| 2014/0067997 A1 | 3/2014 | Saabas et al. | |
| 2014/0095945 A1* | 4/2014 | Sankaran | G06F 11/0754 714/51 |
| 2014/0123151 A1* | 5/2014 | Kishan | G06F 9/4881 718/103 |
| 2015/0089300 A1* | 3/2015 | Tejerina | G06F 11/3476 714/45 |
| 2016/0085416 A1* | 3/2016 | Threlkeld | H04L 67/02 715/766 |
| 2016/0188738 A1* | 6/2016 | Gruber | G06F 17/30976 707/722 |
| 2016/0359673 A1* | 12/2016 | Gupta | H04L 63/1425 |
| 2017/0257303 A1* | 9/2017 | Boyapalle | H04L 67/34 |

OTHER PUBLICATIONS

Cheng, et al., "Composing Adaptive Software", In Proceedings of the Computer, vol. 37, Issue 7, Jul. 1, 2004, pp. 56-64.
Draa, et al., "Application sequence prediction for energy consumption reduction in mobile systems", In Proceedings of the IEEE International Conference on Computer and Information Technology; Ubiquitous Computing and Communications; Dependable, Autonomic and Secure Computing; Pervasive Intelligence and Computing, Oct. 26, 2015, pp. 23-30.
Lee, et al., "An adaptive user interface based on spatiotemporal structure learning", In Proceedings of the IEEE Communications Magazine, vol. 49, Issue 6, Jun. 1, 2011, pp. 118-124.
Nacci, et al., "Morphone. OS: Context-awareness in everyday life", In Proceedings of the 16th Euromicro Conference on Digital System Design, Sep. 4, 2013, pp. 779-786.
Panneerselvam, et al., "Workload analysis for the scope of user demand prediction model evaluations in cloud environments", In Proceedings of the 7th International Conference on Utility and Cloud Computing, Dec. 8, 2014, pp. 883-889.
"International Search Report and Written Opinion Issued in PCT Application No. PCT/US2017/045403", dated Nov. 14, 2017, 14 Pages.

\* cited by examiner

OPTIMIZING PERFORMANCE BASED ON BEHAVIORAL AND SITUATIONAL SIGNALS

CROSS-REFERENCE TO RELATED APPLICATIONS

This Application claims the benefit under 35 U.S.C. § 119(e) of U.S. Provisional Patent Application Ser. No. 62/374,714 filed on Aug. 12, 2016. The disclosure of the U.S. Provisional Patent Applications is hereby incorporated by reference in its entirety.

BACKGROUND

Information exchange have changed processes associated work and personal environments. Automation and improvements in processes have expanded scope of capabilities offered for personal and business consumption. With the development of faster and smaller electronics, execution of mass processes at cloud systems have become feasible. Indeed, applications provided by data centers, data warehouses, data workstations have become common features in modern personal and work environments. Such systems execute a wide variety of applications ranging from enterprise resource management applications to off-the-shelve productivity applications.

Online services and applications increasingly provide useful tools for a variety of customers ranging from large enterprise entities, to small businesses, to individuals. With the increasing variety and depth of the provided services, managing computing resources consumed by services and applications may be difficult for some customers. Enterprise entities typically have dedicated professionals, but individuals or small businesses may lack the resources and knowledge to monitor and maintain services and applications that unnecessarily consume computing resources.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to an optimization of performance based on behavioral and situational signals. In some examples, a productivity service may initiate operations to optimize a performance of a component of an application upon receiving a behavioral signal and/or a situational signal associated with a user. The behavioral signal and/or the situational signal may be analyzed to infer a usage pattern associated with a component of an application. Next, a failure of the usage pattern may be detected in a comparison to an utility threshold. In response, the application may be instructed to interrupt an execution of the component.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
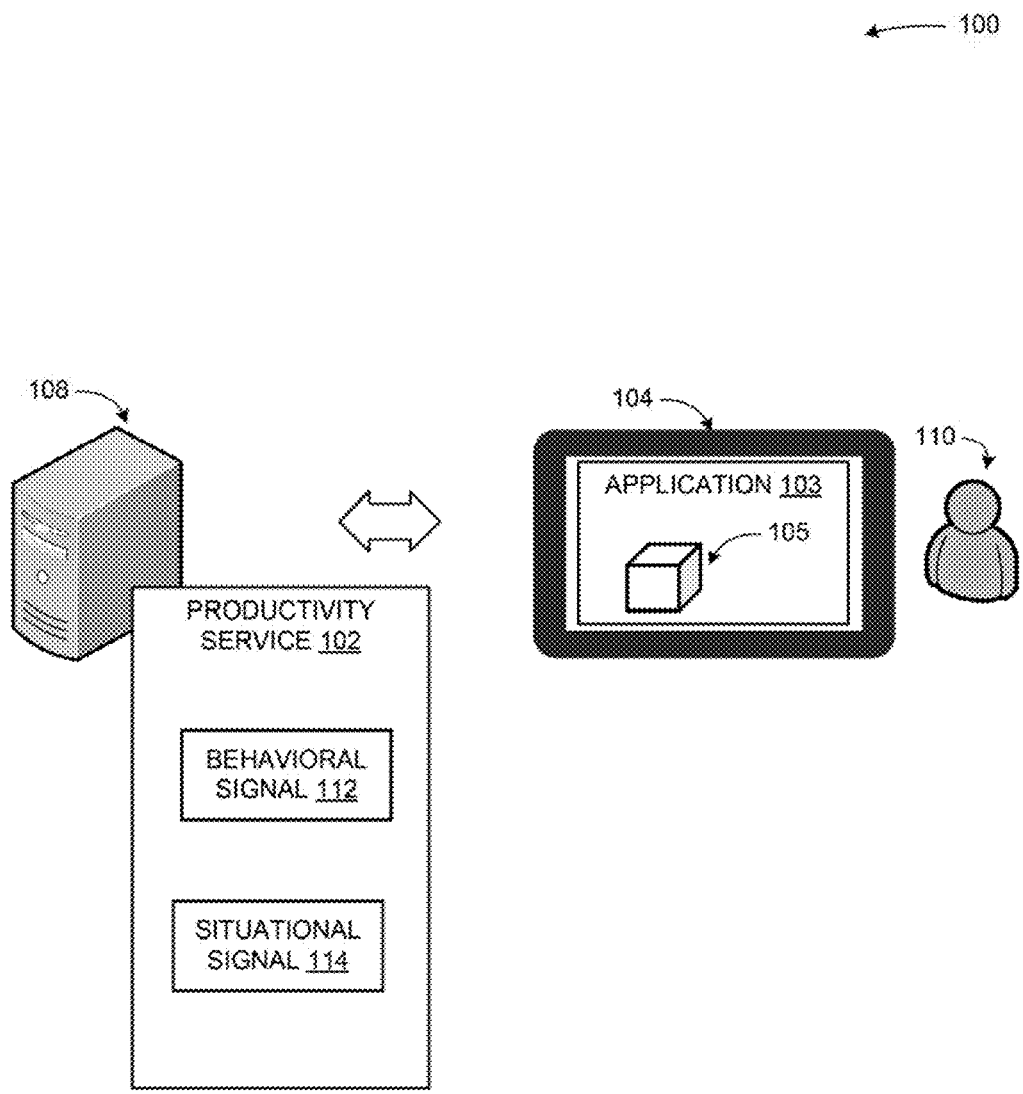
FIG. 1 is a conceptual diagram illustrating an example of optimizing performance based on behavioral and situational signals, according to embodiments.

As briefly described above, a productivity service may optimize performance based on behavioral and situational signals. In an example scenario, the productivity service may receive a behavioral signal and/or a situational signal associated with a user. The behavioral signal may include captured user interaction(s) with the application. Furthermore, the behavioral signal may encapsulate time and frequency of the user interactions. Additionally, the situational signal may include location(s) of the user. The behavioral and the situational signals may be captured during a time period of an expected activity with the user.

The behavioral signal and/or the situational signal may be analyzed to infer a usage pattern associated with a component of an application. The usage pattern may describe timing of activity associated with the component and frequency of the activity. Next, a failure of the usage pattern may be detected in a comparison to an utility threshold. The utility threshold may include a value to compare the usage pattern below which the component may be designated as unnecessary. In response to the failure associated with the usage pattern, the application may be instructed to interrupt an execution of the component.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken, in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a ram-volatile memory, a hard drive, a flash drive, a floppy disk, or a compact disk, and comparable hardware media.

Throughout this specification, the term "platform" may be a combination of software and hardware components for optimizing performance based on behavioral and situational signals. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 is a conceptual diagram illustrating examples of optimizing performance based on behavioral and situational signals, according to embodiments.

In a diagram 100, a server 108 may execute a productivity service 102. The server 108 may include a physical server providing service(s) and/or application(s) to client devices. A service may include an application performing operations in relation to a client application and/or a subscriber, among others. The server 108 may include and/or is part of a workstation, a data warehouse, a data center, and/or a cloud based, distributed computing source, among others.

The server 108 may execute the productivity service 102. The productivity service 102 may initiate operations to optimize performance upon receiving a behavioral signal 112 and/or a situational signal 114 associated with a user 110. The behavioral signal 112 may include captured user interaction(s) with the application 103. The application 103 may be executed by a client device 104. Furthermore, the behavioral signal may encapsulate time and frequency of the user interactions. For example, the application 103 or a monitoring module (of the productivity service 102) may track interaction(s) between the user and the application 103. The interaction(s) may be transmitted to the productivity service 102 as the behavioral signal 112. Additionally, the situational signal 114 may be detected to include location(s) of the user. The behavioral and situational signals (112 and 114) may be captured during a time period of an expected activity with the user 110.

The behavioral signal 112 and/or the situational signal 114 may be analyzed to infer a usage pattern associated with a component 105 of the application 103. The usage pattern may describe timing of an activity associated with the component 105 and frequency of the activity. Next, a failure of the usage pattern may be detected in a comparison to an utility threshold. The utility threshold may include a value to compare the usage pattern, below which the component 105 may be designated as unnecessary. If the component 105 is designated as unnecessary, the productivity service 102 may execute operations to deprioritize the component 105 to conserve resources consumed by the component 105 such as a network bandwidth, memory, processing availability, and/or storage, among others. In response to the failure associated with the usage pattern, the application 103 may be instructed to interrupt an execution of the component 105.

The server 108 may communicate with the client device 104 through a network. The network may provide wired or wireless communications between network nodes such as the client device 104 and/or the server 108, among others. Previous example(s) to optimize performance based on behavioral and situational signals are not provided in a limiting sense. Alternatively, the productivity service 102 may optimize performance of the application 103 based on the behavioral signal 112 and/or the situational signal 114 while executing as a desktop application, a workstation application, and/or a server application, among others. The application 103 may also include a client interface of the productivity service 102.

The user 110 may interact with the application 103, respectively, with a keyboard based input, a mouse based input, a voice based input, a pen based input, and a gesture based input, among others. The gesture based input may include one or more touch based actions such as a touch action, a swipe action, and a combination of each, among others.

While the example system in FIG. 1 has been described with specific components including the server 108, the productivity service 102, embodiments are not limited to these components or system configurations and can be implemented with other system configuration employing fewer or additional components.

Figure 2:
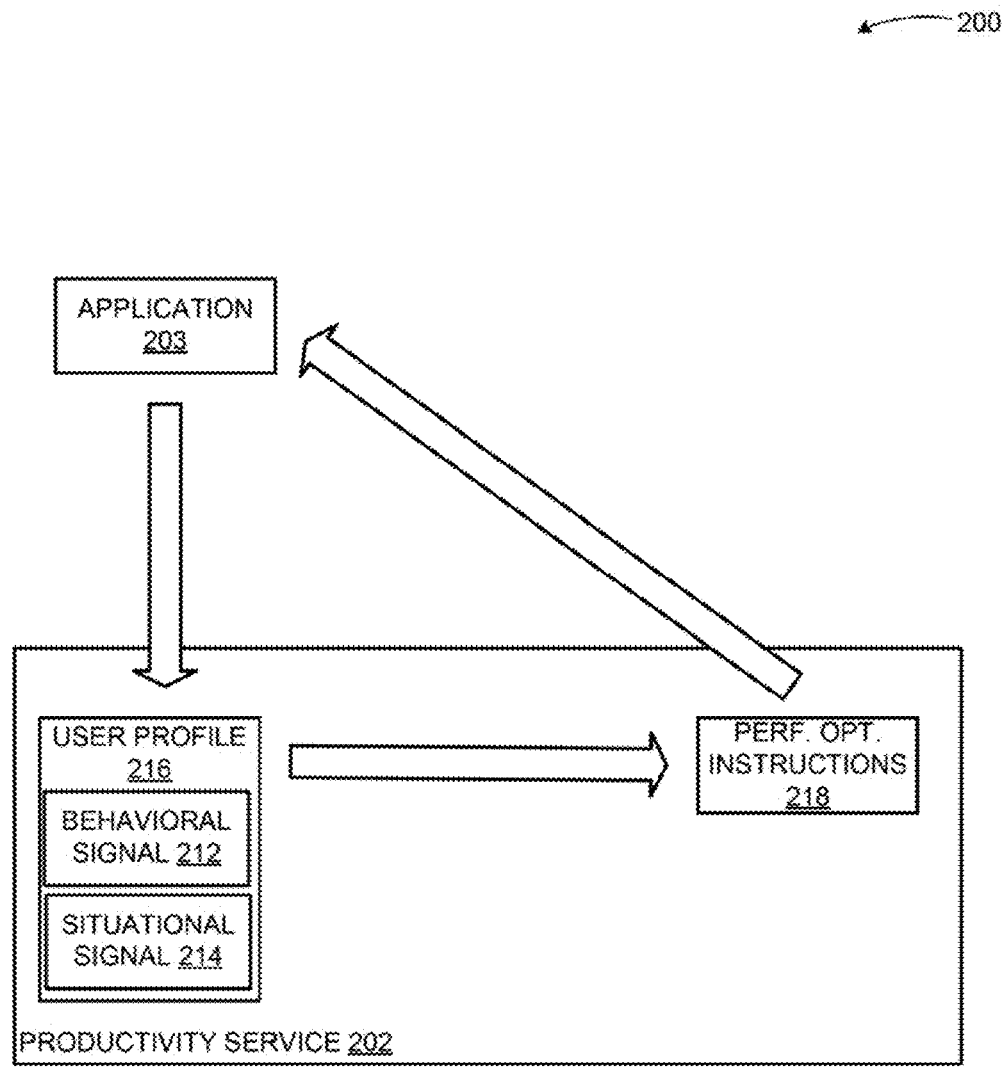
FIG. 2 is a display diagram illustrating example components of a productivity service that optimizes performance based on behavioral and situational signals, according to embodiments.

FIG. 2 is a display diagram illustrating example components of a productivity service that optimizes performance based on behavioral and situational signals, according to embodiments.

As illustrated in diagram 200, a productivity service may monitor component(s) of an application 203 and record a behavioral signal 212 and a situational signal 214 associated with usage of the component(s) (by a user) into a user profile 216. The user profile 216 may include a data structure customized to store signals associated with a user and usage pattern(s) that are detected based on analysis of the behavioral and/or situational signals (212 and/or 214).

The behavioral signal 212 may include measurements of interaction(s) of the user with the application 203. The measurements may capture the timing and frequency of the interaction(s). The situational signal 214 may include measurements of the presence and/or the location of the user. The application 203 may generate the situational signal 214 based on input by the user, hardware sensors monitoring the user, and/or detected patterns associated with the user. The situational signal 214 may also be transmitted from third party sources such as mobile devices with or in proximity to the user.

A performance optimization instruction 218 may be generated based on the usage pattern(s) of the component(s) of the application 203 upon an analysis of the behavioral signal 212 and/or the situational signal 214. The usage pattern(s) may illustrate a necessity of the component(s) to the user when comparing the usage pattern(s) to a utility threshold associated with the component(s). For example, if a usage pattern is determined to fall below the utility threshold then the associated component is designated as unnecessary. Furthermore, the performance optimization instruction 218 may be transmitted to the application 203 to instruct the application 203 to enable, disable, and/or delay activation of the component(s) to optimize resource utilization by the component(s).

Figure 3:
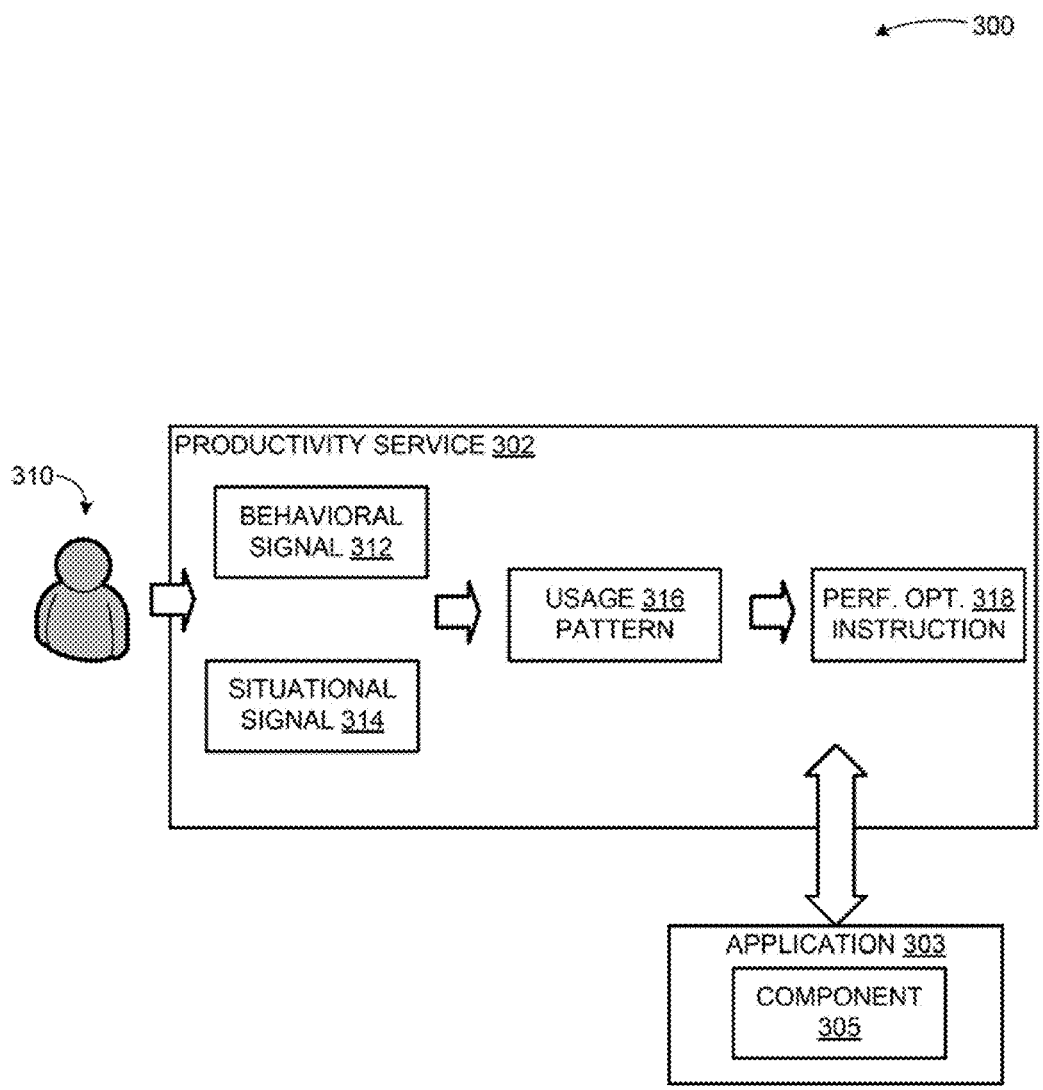
FIG. 3 is a display diagram illustrating components of a scheme to optimize performance based on behavioral and situational signals, according to embodiments.

FIG. 3 is a display diagram illustrating components of a scheme to optimize performance based on behavioral and situational signals, according to embodiments.

As shown in a diagram 300, a productivity service 302 may analyze a behavioral signal 312 and a situational signal 314 associated with a user 310 to infer a usage pattern 316 of a component 305 of an application 303. The behavioral signal 312 may include measurements of user interactions associated with the application 303 within a duration. The behavioral signal 312 may continually be updated in real-time which allows real-time analysis of interaction(s) monitored between the user 310 and the application 303.

The application 303 may monitor interactions of the user 310 and generate the behavioral signal 312. Alternatively, the productivity service 302 may interact with a monitor module (that executes within a computing device which hosts the application 303) to track the application 303 and generate the behavioral signal 312. In another example scenario, a third party provider may monitor the application 303 and generate the behavioral signal 312 which may be provided to the productivity service 302.

The situational signal 314 associated with the user 310 may be received from a variety of sources. For example, a location of the user 310 may be detected by receiving coordinate and/or mapping information from a mobile device carried by the user 310. Similarly, a presence of the user 310 may be received from a monitoring application associated with the user 310 (that updates the presence of the user 310). The situational signal 314 may be created from variety of data (such as location and presence information) from variety of devices and applications associated with the user 310 gathered within a duration. Similar to the behavioral signal 312, the situational signal 314 may be updated in real-time which may allow real-time analysis of a status of the user 310 in relation to the application 303.

For example, an available and/or an online status of the user 310 (or a location detected near a computing device executing the application 303) may be interpreted as a readiness to access the component 305 of the application 303. In such a scenario, the application 303 may be provided a performance optimization instruction 318 that instructs the application 303 to keep the component 305 active. Alternatively, an offline status of the user 310 (or a location detected as away from a computing device executing the application 303) may be interpreted as unavailability to access the component 305 of the application 303. In such a scenario, the application 303 may be provided with the performance optimization instruction 318 that instructs the application 303 to deactivate the component 305 or delay an execution (also known as loading) of the component 305. As such, the application 303 may be prompted to release resource(s) dedicated for the component 305 such as network bandwidth, processor resources, memory resources, and/or storage resources, among others.

The productivity service 302 may analyze the behavioral signal 312 and the situational signal 314 to identify a usage pattern 316 of the component 305 of the application 303. For example, the productivity service 302 may detect that the user 310 has never used the component 305 of the application 302. Upon detecting the usage pattern 316 that indicates a failure to use the component 305, a performance optimization instruction 318 may be transmitted to the application 303 to deactivate the component and to release resources reserved for the component 305. A number of interactions between the user 310 and the component 305 may also be compared to a utility threshold linked to the component 305. The utility threshold may be a dynamically or statically configurable value to reflect relevant usage of the component 305. If the usage pattern is detected to exceed the utility threshold, the application 303 may be instructed (using the performance optimization instruction 318) to enable the component 305. If the usage pattern is detected to fall below (or equal) the utility threshold, the application 303 may be instructed (using the performance optimization instruction 318) to disable or to delay an activation of the component 305.

In another example scenario, the usage pattern 316 may be detected to indicate intermittent usage of the component 305 that may be on a repeatable schedule. In such a scenario, the productivity service 302 may transmit the performance optimization instruction 318 to the application 303 to deactivate the component 305 and to release resources reserved for the component 305 during periods of inactivity when the user does not access the component 305. The performance optimization instruction 318 may also include instructions to prepare the component 305 upon a detected period of use (based on a repeatable schedule or on demand).

In other example scenarios, the situational signal 314 may include information related to a geographic location information associated with the user 310. The geographic location information may be analyzed to infer the usage pattern 316 associated with the component 305. For example, the situational signal 314 may be analyzed to detect the user 310 in a geographical location away from location(s) linked to usage of the component 305 (such as, an office location, and/or a home location, among others). In such a scenario, the usage pattern 316 may be interpreted as an intent of the user 310 to not use the component 305. In such a scenario, the productivity service 302 may transmit the performance optimization instruction 318 to the application 303 to instruct the application 303 to disable the component 305 and release resources consumed by the component 305. Alternatively, the application 303 may be instructed to not load the component 305.

The situational signal 314 may also include information related to resources consumed by the application 303. The resource information may identify consumption information and availability of the resources. An example may include bandwidth consumption and availability. For example, the productivity service 302 may detect high bandwidth usage by the component 305 by analyzing the situational signal 314. If the productivity service 302 detects a usage pattern 316 of the component 305 by the user 310 that does not exceed a utility threshold, the productivity service 302 may instruct the application 303 to disable the component 305 with the performance optimization instruction 318 to conserve bandwidth usage by the component 305. In another example, the productivity service 302 may also instruct the application 303 to disable or lower resource consumption of the component 305 upon detecting limited availability of a resource such as a network bandwidth that falls below an availability threshold.

In another example, the behavioral signal 312 may include usage information of the application 303 (such as a browser) by the user 310. The usage information may be analyzed to identify the usage pattern 316 of the component 305 by the user 310. The usage pattern 316 may include a number of interactions, timing of the interactions, and/or frequency of the interactions, among other measurements of interactions between the user 310 and the component 305 (and/or the application 303). The usage pattern 316 may be compared against an utility threshold to determine whether the user 310 uses the component 305. If the usage pattern 316 fails to exceed the utility threshold then the productivity service 302 may transmit the performance optimization instruction 318 to instruct the application 303 to disable or decrease a resource consumption and/or a priority associated with the component 305.

While the productivity service 302 is used as an illustrative example herein, embodiments may be implemented in other service environments as well. For example, the productivity service 302 may monitor components of an operating system based on the behavioral signal 312 and the situational signal associated with the user 310 of the operating system. The productivity service 302 may instruct the operating system with the performance optimization instruction 318 to activate and/or de-activate components of the operating system as well as delay loading of components based on the usage pattern 316. The performance optimization instruction 318 is generated based on the usage pattern 316 inferred from the behavioral and/or situational signals (312 and/or 314). Alternatively, the productivity service 302 may perform signal analysis to generate the performance optimization instruction 318 to activate/de-activate/delayed activate hardware components of computing devices based on the usage pattern 316 detected from the behavioral and/or situational signals (312 and/or 314).

Figure 4:
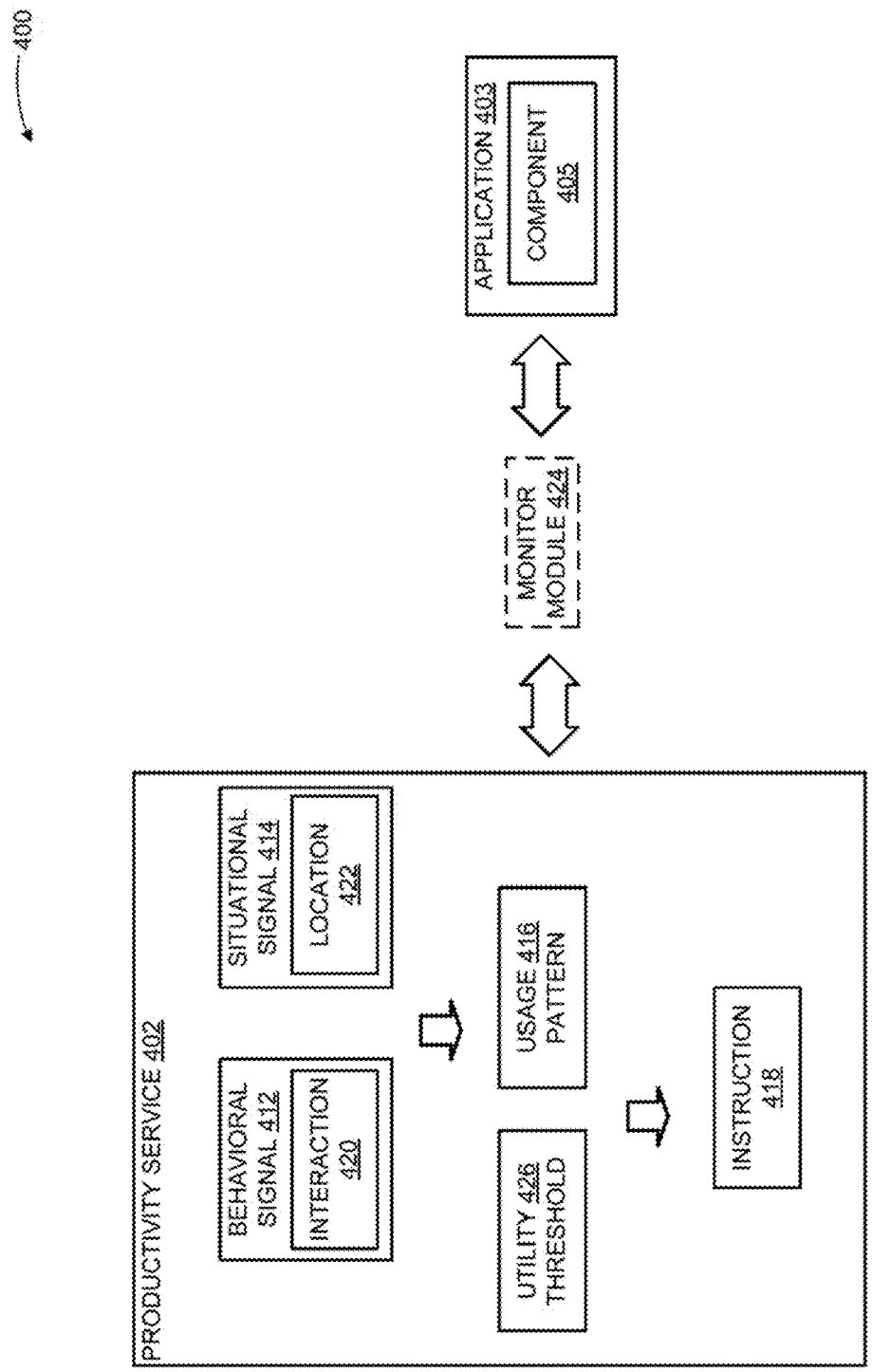
FIG. 4 is a display diagram illustrating an example of optimizing performance based on behavioral and situational signals, according to embodiments.

FIG. 4 is a display diagram illustrating an example of optimizing performance based on behavioral and situational signals, according to embodiments.

As shown in a diagram 400, a productivity service 402 may receive a behavioral signal 412 from an application 403 or a monitor module 424 that tracks the application 403. The behavioral signal 412 may include measurements of interactions (such as the interaction 420) between a user and the application 403. The productivity service 402 may also receive a situational signal 414 from the application 403 or the monitor module 424 that tracks the application 403. The situational signal 414 may include situational information associated with the user (or the application 403) such as a location 422 of the user.

The behavioral signal 412 and/or the situational signal 414 may be processed to produce a usage pattern 416. The usage pattern 416 may describe a time of the interaction 420 between a component 405 of the application 403 and the user, a frequency of other interactions between the component 405 and the user, and/or the location of the user in relation to a computing device that provides the application 403.

The usage pattern 416 may be compared to a utility threshold 426. The utility threshold 426 may include a value such as a number of interactions to designate the component 405 as necessary to the user. Alternatively, the location of the user stored in the usage pattern 416 may be compared to the utility threshold that includes a positional area correlated with an expected activity of the user with the application 403. An example may include the positional area that represents a proximity, of the user to the computing device that provides the application 403. If the location of the user is detected as within the positional area then the component 405 may be designated as necessary to the user.

An instruction 418 (such as a performance optimization instruction) may be generated and transmitted to the application 403 to prompt the application 403 to activate, deactivate, and/or delay activate the component 405. The instruction may prompt the application 403 to activate the component 405 if the usage pattern 416 exceeds the utility threshold 426, the application 403 may be instructed to activate the component 405. Alternatively, if the usage pattern 416 is detected as equal or falling below the utility threshold 426, the application 403 may be instructed to deactivate and/or delay activate the component 405. A decision to deactivate and/or delay activate the component 405 may be generated based on an evaluation of available resources to activate the component 405 following a time delay. For example, if the resources may be deemed available upon the time delay then the decision may be made to delay activate the component 405 upon the time delay. Furthermore, the time delay may be shortened or extended based on changes to the availability of the resources to activate the component 405. Alternatively, the decision may be made to deactivate the component 405 if the resources may be deemed as unavailable. A delay may also be introduced to a deactivation cycle of the component 405 based on demand.

As discussed above, the productivity service may be employed to perform operations to automate performance optimization based on behavioral and situational signals. An increased performance and efficiency improvement with an application 103 may occur as a result of processing behavioral and/or situational signals associated with the application to produce a usage pattern associated with a component of the application 103. Additionally, dynamic evaluation of the usage pattern against an utility threshold to induce an activation, a delayed activation, and/or deactivation of the component of the application 103, by the productivity service 102, may reduce processor load, increase processing speed, conserve memory, and reduce network bandwidth usage.

Embodiments, as described herein, address a need that arises from a lack of efficiency to optimize performance based on behavioral and situational signals. The actions/operations described herein are not a mere use of a computer, but address results that are a direct consequence of software used as a service offered to large numbers of users and applications.

The example scenarios and schemas in FIG. 1 through 4 are shown with specific components, data types, and configurations. Embodiments are not limited to systems according to these example configurations. Optimizing performance based on behavioral and situational signals may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
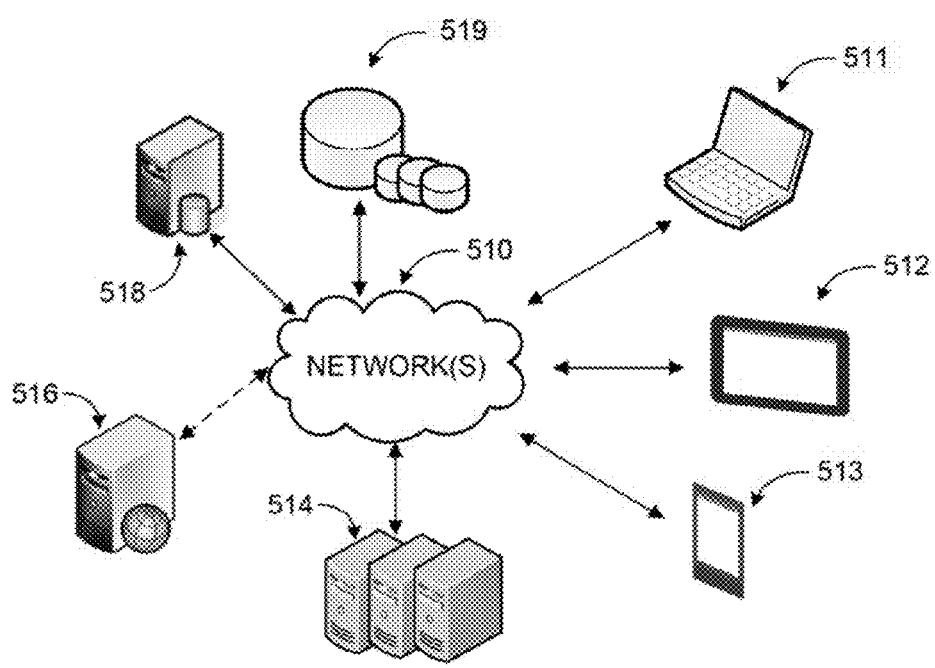
FIG. 5 is a simplified networked environment, where a system according to embodiments may be implemented.

FIG. 5 is an example networked environment, where embodiments may be implemented. A productivity service configured to optimize performance based on behavioral and situational signals may be implemented via software executed over one or more servers 514 such as a hosted service. The platform may communicate with client applications on individual computing devices such as a smart phone 513, a mobile computer 512, or desktop computer 511 (client devices') through network(s) 510.

Client applications executed on any of the client devices 511-513 may facilitate communications via application(s) executed by servers 514, or on individual server 516. A productivity service may receive a behavioral signal and/or a situational signal associated with a user. The behavioral signal and/or the situational signal may be analyzed to infer a usage pattern associated with a component of an application. Next, a failure of the usage pattern may be detected in a comparison to an utility threshold. In response, the application may be instructed to interrupt an execution of the component. The productivity service, may store data associated with the component of the application in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to optimize performance based on behavioral and situational signals. Furthermore, the networked environments discussed in FIG. 5 are for illustration purposes only. Embodiments are not limited to the example applications, modules, or processes.

Figure 6:
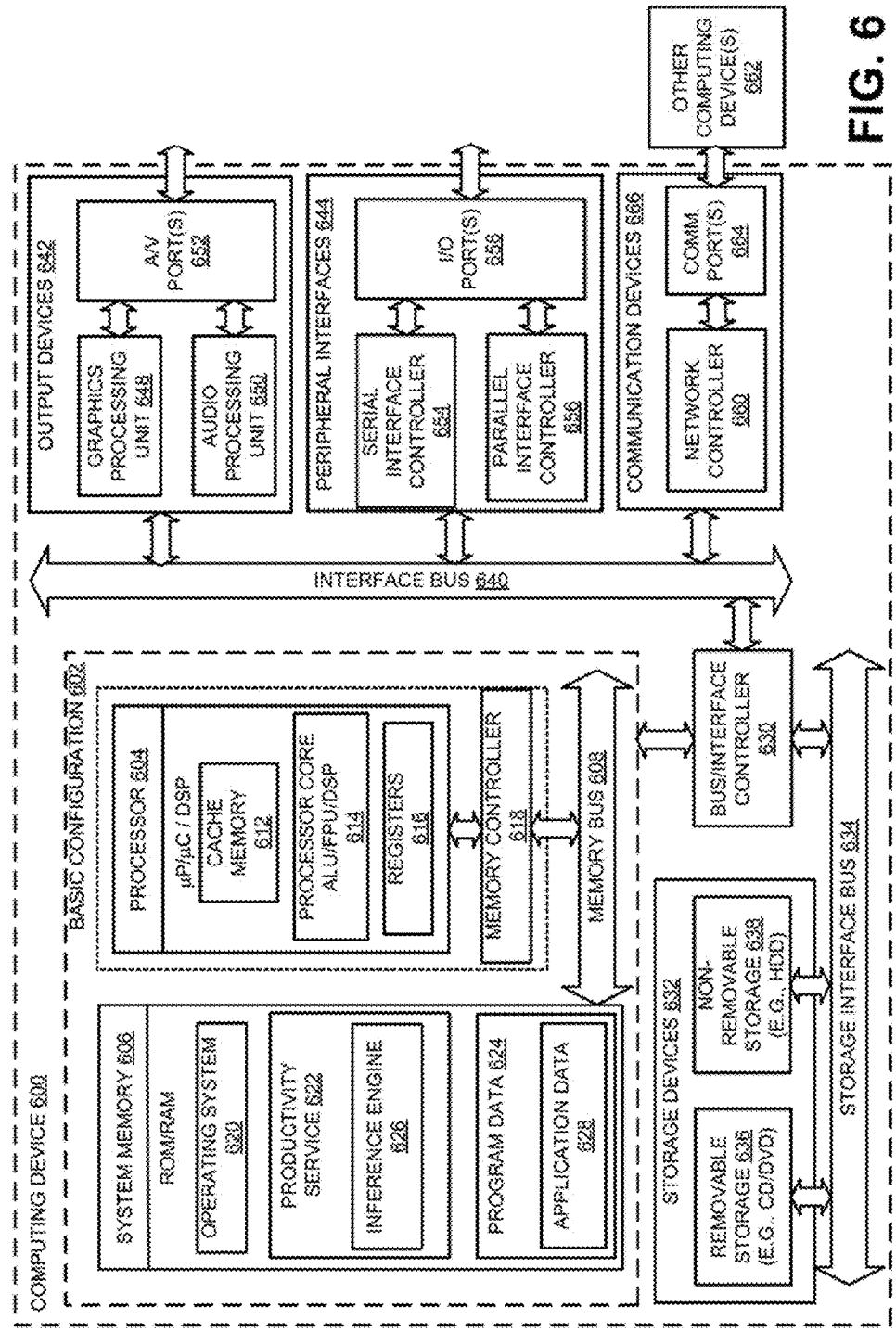
FIG. 6 is a block diagram of an example computing device, which may be used to optimize performance based on behavioral and situational signals, according to embodiments.

FIG. 6 is a block diagram of an example computing device, which may be used to optimize performance based on behavioral and situational signals, according to embodiments.

For example, computing device 600 may be used as a server, desktop computer, portable computer, smart phone, special purpose computer, or similar device. In an example basic configuration 602, the computing device 600 may include one or more processors 604 and a system memory 606. A memory bus 698 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing sore (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a productivity service 622, and a program data 624. The productivity service 622 may include a component such as an inference engine 626. The inference engine 626 may execute processes associated with the productivity service 622. The inference engine 626 may receive a behavioral signal and/or a situational signal associated with a user. The behavioral signal and/or the situational signal may be analyzed to infer a usage pattern associated with a component of an application. Next, a failure of the usage pattern may be detected in a comparison to an utility threshold. In response, the application may be instructed to interrupt an execution of the component.

Input to and output out of the productivity service 622 may be transmitted through a communication module associated with the computing device 600. An example of the communication module may include a communication device 666 that may be communicatively coupled to the computing device 600. The communication module may provide wired and/or wireless communication. The program data 624 may also include, among other data, application data 628, or the like, as described herein. The application data 628 may include a behavioral signal, and/or a situational signal, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDDs), optical disk drives such as compact disk (CD) drives or digital versatile, disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example of the communication device(s) 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as, acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations. Additionally, the computing device 600 may include specialized hardware such as an application-specific integrated circuit (ASIC), a field programmable gate array (FPGA), a programmable logic device (PLD), and/or a free form logic on an integrated circuit (IC), among others.

Example embodiments may also include methods to optimize performance based on behavioral and situational signals. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
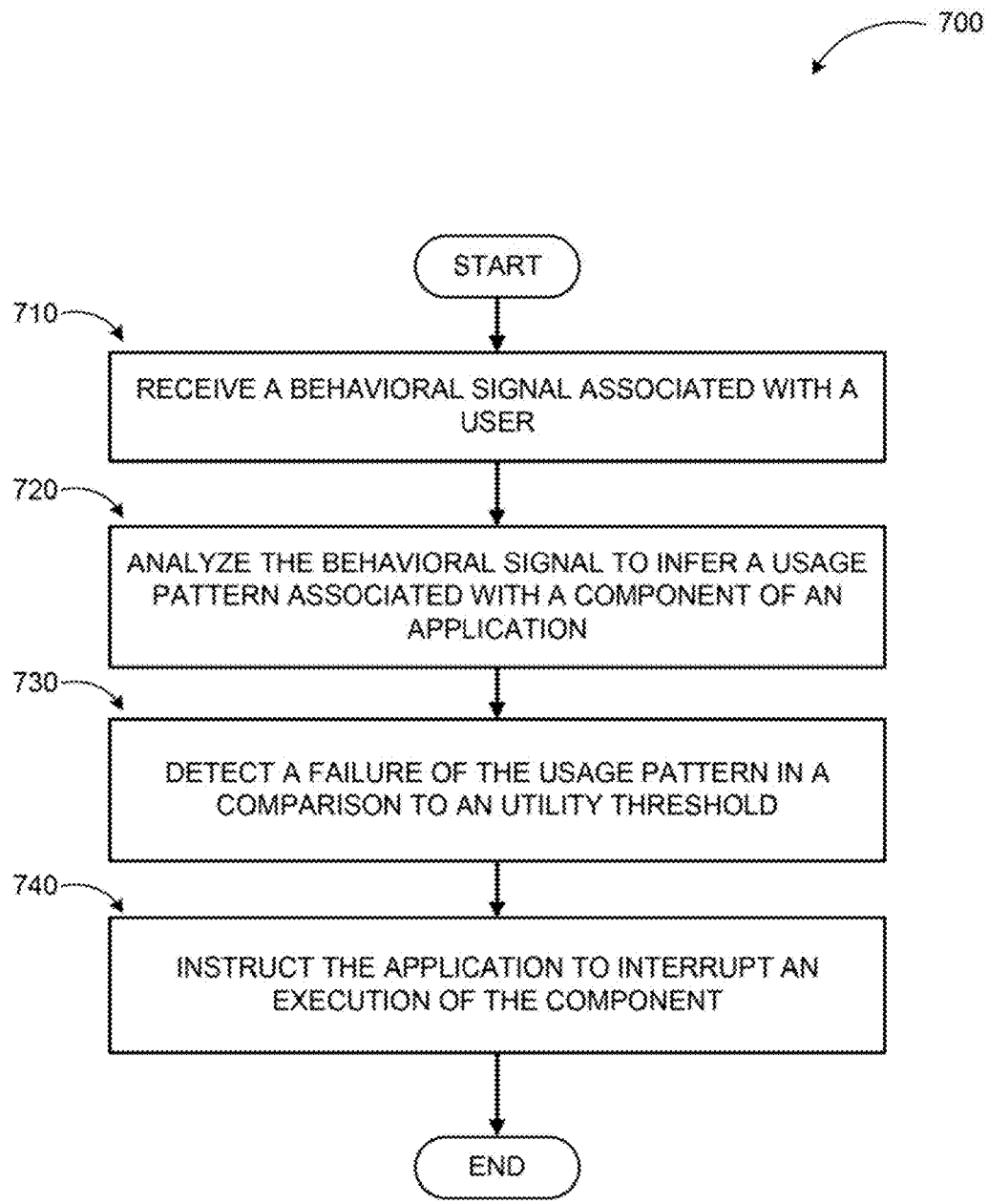
FIG. 7 is a logic flow diagram illustrating a process for optimizing performance based on behavioral and situational signals, according to embodiments.

FIG. 7 is a logic flow diagram illustrating a process for optimizing performance based on behavioral and situational signals, according to embodiments. Process 700 may be implemented on a computing device, such as the computing device 600 or another system.

Process 700 begins with operation 710, where the productivity service may receive a behavioral signal and/or a situational signal associated with a user. The behavioral signal may include captured user interaction(s) with the application. Furthermore, the behavioral signal may encapsulate time and frequency of the user interactions. The situational signal may be detected to include location(s) of the user. The behavioral and the situational signals may be captured during a time period of an expected activity with the user.

At operation 720, the behavioral signal and/or the situational signal may be analyzed to infer a usage pattern associated with a component of an application. The usage pattern may describe timing of activity associated with the component and frequency of the activity. Next at operation 730, a failure of the usage pattern may be detected in a comparison to an utility threshold. The utility threshold may include a value to compare the usage pattern below which the component may be designated as unnecessary. At operation 740, the application may be instructed to interrupt an execution of the component.

The operations included in process 700 is for illustration purposes. Optimizing performance based on behavioral and situational signals may be implemented by similar processes with fewer or additional steps, as well as in different order of operations using the principles described herein. The operations described herein may be executed by one or more processors operated on one or more computing devices, one or more processor cores, specialized processing, devices, and/or general purpose processors, among other examples.

In some examples, a method executed on a computing device to optimize performance based on behavioral and situational signals is described. The method includes receiving a behavioral signal associated with a user, analyzing the behavioral signal to infer a usage pattern associated with a component of an application, detecting a failure of the usage pattern in a comparison to an utility threshold, and instructing the application to interrupt an execution of the component.

In other examples, the method further includes transmitting an instruction to the application to capture one or more user interactions with the application as the behavioral signal and processing the one or more user interactions to produce the usage pattern. The instruction prompts the application to capture the one or more user interactions during a time period of an expected activity with the user. Detecting the failure associated with the usage pattern includes configuring the utility threshold at a value that correlates to a single interaction directed to the component of the application and fading to detect the single interaction within the usage pattern. Detecting the failure associated with the usage pattern includes configuring the utility threshold at a value that correlates to a number of the one or more user interactions directed to the component of the application and failing to detect the number of the one or more user interactions within the usage pattern.

In further examples, the method further includes transmitting an instruction to the application to capture in real time one or more user interactions with the application as the behavioral signal, receiving the one or more user interactions as the behavioral signal in real time, and updating the usage pattern by processing the one or more user interactions in real time. The method further includes transmitting an instruction to a monitor module to capture one or more user interactions with the application as the behavioral signal, where the monitor module is tracking the one or more user interactions with the application, receiving the one or more user interactions as the behavioral signal from the monitor module, and processing the one or more user interactions to produce the usage pattern.

In other examples, the method further includes receiving a situational signal associated with the user and analyzing the situational signal to update the usage pattern associated with the component of the application. The method further includes producing the usage pattern from one or more locations of the user detected within the situational signal and configuring the utility threshold as a positional area correlated with an expected activity of the user. Detecting the failure associated with the usage pattern includes identifying the one or more locations of the user as outside the positional area. The method further includes receiving an update, to the behavioral signal, revising the usage pattern based on the update, detecting the usage pattern exceed the utility threshold, and instructing the application to activate the component.

In some examples, a server configured to optimize performance based on behavioral and situational signals is described. The server includes a communication module configured to facilitate communication between a productivity service and one or more devices which execute an application, a memory configured to store instructions, and a processor coupled to the memory and the communication module. The processor executes the productivity service in conjunction with the instructions stored in the memory. The productivity service includes an inference engine. The inference engine is configured to receive a behavioral signal and a situational signal associated with a user, analyze the behavioral signal and the situational signal to infer a usage pattern associated with a component of the application, detect a failure associated with the usage pattern in a comparison with an utility threshold, and instruct the application to deprioritize the component.

In other examples, instructing the application to deprioritize the component includes one or more operations to delay an execution of the component. The inference engine is further configured to adjust a time of delay based on one or more of; an availability of one or more resources to execute the component and an execution priority of a module consuming one or more shared resources with the component. Instructing the application to deprioritize the component includes one or more operations to disable the component and release one or more resources used to execute the component. The inference engine is further configured to detect a consumption information associated with one or more resources in the situational signal and produce the usage pattern from the consumption information of a subset of the one or more resources used by the component. The inference engine is further configured to configure the utility threshold with a value matching an expected consumption level of the one or more resources and discover the failure associated with the usage pattern by detecting the usage pattern exceed the utility threshold.

In some examples, a method executed on a computing device to optimize performance based on behavioral and situational signals is described. The method includes actions that are similar to actions of the method previously described.

In some examples, a means for optimizing performance based on behavioral and situational signals is described. The means for optimizing performance based on behavioral and situational signals includes a means for receiving a behavioral signal associated with a user, a means for analyzing the behavioral signal to infer a usage pattern associated with a component of an application, a means for detecting a failure of the usage pattern in a comparison to an utility threshold, and a means for instructing the application to interrupt an execution of the component.

The above specification, examples and data provide a complete description of the manufacture and se of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to optimize performance based on behavioral and situational signals, the method comprising:
   receiving a behavioral signal associated with a user;
   receiving a situational signal identifying one or more locations of the user;
   analyzing the behavioral signal and the situational signal to infer a usage pattern associated with a component of an application, wherein the usage pattern is associated with the one or more locations of the user;
   determining whether the one or more locations of the user are within a positional area associated with a utility threshold representing a minimum usage of the component by the user within the positional area;
   in response to the one or more locations of the user being outside the positional area, instructing the application to interrupt an execution of the component; and
   in response to the one or more locations of the user being within the positional area,
      comparing the usage pattern to the utility threshold representing the minimum usage of the component by the user within the positional area, and
      in response to the usage pattern being below the utility threshold, instructing the application to interrupt the execution of the component.

2. The method of claim 1, further comprising:
   transmitting an instruction to the application to capture one or more user interactions with the application as the behavioral signal; and
   processing the one or more user interactions to produce the usage pattern.

3. The method of claim 2, wherein the instruction prompts the application to capture the one or more user interactions during a time period of an expected activity with the user.

4. The method of claim 2,
   wherein configuring the utility threshold includes configuring the utility threshold at a value that correlates to a single interaction directed to the component of the application, and
   wherein comparing the usage pattern to the utility threshold includes failing to detect the single interaction within the usage pattern.

5. The method of claim 2,
   wherein configuring the utility threshold includes configuring the utility threshold at a value that correlates to a number of the one or more user interactions directed to the component of the application, and
   wherein comparing the usage pattern to the utility threshold includes failing to detect the number of the one or more user interactions within the usage pattern.

6. The method of claim 1, further comprising:
   transmitting an instruction to the application to capture in real time one or more user interactions with the application as the behavioral signal;
   receiving the one or more user interactions as the behavioral signal in real time; and
   updating the usage pattern by processing the one or more user interactions in real time.

7. The method of claim 1, further comprising:
   transmitting an instruction to a monitor module to capture one or more user interactions with the application as the behavioral signal, wherein the monitor module is tracking the one or more user interactions with the application;
   receiving the one or more user interactions as the behavioral signal from the monitor module; and processing the one or more user interactions to produce the usage pattern.

8. The method of claim 1, wherein receiving the situational signal includes receiving a situational signal associated with the user, and analyzing the situational signal to update the usage pattern associated with the component of the application.

9. The method of claim 8, further comprising:
producing the usage pattern from the one or more locations of the user detected within the situational signal; and
configuring the utility threshold as the positional area correlated with an expected activity of the user.

10. The method of claim 1, further comprising:
receiving an update to the behavioral signal;
revising the usage pattern based on the update;
detecting that the usage pattern exceeds the utility threshold; and
instructing the application to activate the component.

11. A server configured to optimize performance based on behavioral and situational signals, the server comprising:
a memory configured to store instructions; and
a processor coupled to the memory, the processor executing a productivity service in conjunction with the instructions stored in the memory, wherein the processor is configured to:
receive a behavioral signal and a situational signal associated with a user, wherein the situational signal identifies one or more locations of the user;
analyze the behavioral signal and the situational signal to infer a usage pattern associated with a component of the application, wherein the usage pattern is associated with the one or more locations of the user;
determine whether the one or more locations of the user are within a positional area associated with a utility threshold representing a minimum usage of the component by the user within the positional area;
in response to the one or more locations of the user being outside the positional area, instruct the application to deprioritize the component; and
in response to the one or more locations of the user being within the positional area,
compare the usage pattern to the utility threshold representing the minimum usage of the component by the user within the positional area, and
in response to the usage pattern being below the utility threshold, instruct the application to deprioritize the component.

12. The server of claim 11, wherein instructing the application to deprioritize the component includes one or more operations to:
delay an execution of the component.

13. The server of claim 12, wherein the processor is further configured to:
adjust a time of delay based on one or more of: an availability of one or more resources to execute the component and an execution priority of a module consuming one or more shared resources with the component.

14. The server of claim 11, wherein instructing the application to deprioritize the component includes one or more operations to:
disable the component; and
release one or more resources used to execute the component.

15. The server of claim 11, wherein the processor is further configured to:
detect a consumption information associated with one or more resources in the situational signal; and
produce the usage pattern from the consumption information of a subset of the one or more resources used by the component.

16. The server of claim 15, wherein the processor is further configured to:
configure the utility threshold with a value matching an expected consumption level of the one or more resources; and
discover a failure associated with the usage pattern by detecting that the usage pattern exceeds the utility threshold.

17. A method executed on a computing device to optimize performance based on behavioral and situational signals, the method comprising:
receiving a behavioral signal and a situational signal associated with a user from a monitor module, wherein the monitor module is tracking one or more interactions with an application and wherein the situational signal identifies one or more locations of the user;
analyzing the behavioral signal and the situational signal to infer a usage pattern associated with a component of the application, wherein the usage pattern is associated with the one or more locations of the user;
determining whether the one or more locations of the user are within a positional area associated with a utility threshold representing a minimum usage of the component by the user within the positional area;
in response to the one or more locations of the user being outside the positional area, instructing the application to deprioritize the component; and
in response to the one or more locations of the user being within the positional area,
comparing the usage pattern to the utility threshold representing the minimum usage of the component within the positional area; and
in response to the usage pattern being below the utility threshold, instructing the application to deprioritize the component.

18. The method of claim 17, further comprising:
transmitting an instruction to the application to capture in real time the one or more interactions with the application as one or more of the behavioral signal and the situational signal;
receiving the one or more interactions in real time; and
updating the usage pattern by processing the one or more interactions in real time.

19. The method of claim 17, further comprising:
detecting a consumption information associated with one or more resources in the situational signal;
producing the usage pattern from the consumption information of a subset of the one or more resources used by the component;
configuring the utility threshold at a value matching an expected consumption level of the one or more resources; and
discovering a failure associated with the usage pattern by detecting that the usage pattern exceeds the utility threshold.

* * * * *